US012771448B1

(12) United States Patent
Zhang et al.

(10) Patent No.: US 12,771,448 B1
(45) Date of Patent: Oct. 20, 2026

(54) OPTICAL TRANSCEIVER APPARATUS, COMMUNICATION NODE, AND COMMUNICATION SYSTEM

(71) Applicant: SILITH TECHNOLOGY PTE. LTD., Singapore (SG)

(72) Inventors: Ke Zhang, Singapore (SG); Jui Hong Hsu, Singapore (SG)

(73) Assignee: SILITH TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 19/635,688

(22) Filed: Mar. 31, 2026

(51) Int. Cl.
*H04B 10/25* (2013.01)
*H04B 10/40* (2013.01)
*H04B 10/50* (2013.01)
*H04B 10/60* (2013.01)

(52) U.S. Cl.
CPC ......... *H04B 10/2589* (2020.05); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS 7,103,238 B2 * 9/2006 Shyu .................... G02B 6/4215 257/E31.118
7,343,093 B2 * 3/2008 Oberg ................. H04J 14/0283 398/59
2002/0089719 A1 * 7/2002 Joo ..................... H04J 14/0213 398/67
2007/0098405 A1 * 5/2007 McEwan ................. H04J 14/02 398/58
2012/0093514 A1 * 4/2012 Park .................... H04J 14/0279 398/79

* cited by examiner

*Primary Examiner* — Darren E Wolf
(74) *Attorney, Agent, or Firm* — JCIPRNET

(57) ABSTRACT

The present application relates to an optical transceiver apparatus, a communication node, and a communication system. The communication system includes a first communication node, a second communication node, a first optical fiber, and a second optical fiber; wherein the first communication node includes a first optical transceiver apparatus, and the second communication node includes a second optical transceiver apparatus and a third optical transceiver apparatus; the first optical transceiver apparatus is in a bidirectional optical communication connection with the second optical transceiver apparatus through the first optical fiber, and the first optical transceiver apparatus is in a bidirectional optical communication connection with the third optical transceiver apparatus through the second optical fiber; the first optical transceiver apparatus, the second optical transceiver apparatus and the third optical transceiver apparatus are all silicon optical devices. The present application is able to reduce cost of a communication system while increase a transmission rate.

16 Claims, 2 Drawing Sheets

OPTICAL TRANSCEIVER APPARATUS, COMMUNICATION NODE, AND COMMUNICATION SYSTEM

FIELD OF THE APPLICATION

The present application relates to the technical field of optical communication, and specifically, to an optical transceiver apparatus, a communication node, and a communication system.

BACKGROUND

In the related art, the development of optical fiber bidirectional communication technology is a process of a transmission dimension being continuously renewing and a multiplexing efficiency being continuously improving. An initial implementation mode is a dual-fiber unidirectional transmission based on space-division multiplexing, that is, it adopts two independent optical fibers, and each takes a function of sending signals and a function of receiving signals respectively. Then the technology evolves to a phase of adopting a single-fiber to achieve a bidirectional transmission, and a core thereof is introducing a technology of wavelength-division multiplexing and time-division multiplexing. The technology of wavelength-division multiplexing is allocating different wavelengths to different optical signals transmitting in an uplink direction and a downlink direction, to achieve independent transmission, and adopting an optical filter for multiplexing and demultiplexing, so as to implement that a signal is transmitted following its own channel in one single optical fiber. The technology of time-division multiplexing is achieving a time-sharing transmission in an uplink direction for a passive optical network architecture, by controlling a time slot accurately.

Shown as FIG. 1, a dual-fiber bidirectional transmission system based on space-division multiplexing is a basic physical architecture solution for implementing bidirectional communication in optical fiber communication. A core principle thereof is: adopting two optical fibers Fb1 and Fb2 physically independent to each other, to construct a fixed one-way transmission channel respectively. Wherein one optical fiber Fb1 is configured for data transmission (TX) from node A to node B, another optical fiber Fb2 is configured for data reception (RX) from node B to node A. The "space-division multiplexing" concept herein refers to distinguishing a communication direction by means of different paths in a physical space (i.e. different optical fibers).

Shown as FIG. 2, a single-fiber bidirectional communication system based on the wavelength-division multiplexing, is allocating two optical signals of different wavelengths λ1 and λ2 for two transmission directions, thereby realizing a high-speed and large-capacity bidirectional data transmission. At present, in a mainstream fiber-optic communication system, it mainly adopts a waveband of 1310 nm to implement a data uplink transmission (from a user to a network), and a waveband of 1550 nm to implement a data downlink transmission (from a network to a user).

However, the dual-fiber bidirectional transmission system based on the space-division multiplexing and the single-fiber bidirectional communication system based on the wavelength-division multiplexing have a plurality of disadvantages including a high cost, a complex system, and a low transmission rate.

BRIEF SUMMARY OF THE DISCLOSURE

Technical Problem

The technical problem to be solved by the present application is providing an optical transceiver apparatus, a communication node, and a communication system, so as to lower a cost of a communication system, and improve a transmission rate.

Technical Solution

According to a first aspect of an embodiment of the present application, a communication system is provided, comprising: a first communication node, a second communication node, a first optical fiber, and a second optical fiber; wherein:

- the first communication node comprises a first optical transceiver apparatus, and the second communication node comprises a second optical transceiver apparatus and a third optical transceiver apparatus; the first optical transceiver apparatus is in a bidirectional optical communication connection with the second optical transceiver apparatus through the first optical fiber, and the first optical transceiver apparatus is in a bidirectional optical communication connection with the third optical transceiver apparatus through the second optical fiber; the first optical transceiver apparatus, the second optical transceiver apparatus and the third optical transceiver apparatus are all silicon optical devices;
- the first optical transceiver apparatus is configured to convert four first electrical signals having been received into a first group of optical signals and a second group of optical signals, send the first group of optical signals to the second optical transceiver apparatus through the first optical fiber, and send the second group of optical signals to the third optical transceiver apparatus through the second optical fiber; the first group of optical signals comprises a first optical signal having a first wavelength and a second optical signal having a second wavelength, the second group of optical signals comprises a third optical signal having the first wavelength and a fourth optical signal having the second wavelength; the second optical transceiver apparatus is configured to convert the first optical signal and the second optical signal in the first group of optical signals into two first electrical signals correspondingly, and the third optical transceiver apparatus is configured to convert the third optical signal and the fourth optical signal in the second group of optical signals into two first electrical signals correspondingly;
- the second optical transceiver apparatus is further configured to convert two second electrical signals having been received into a third group of optical signals, before sending to the first optical transceiver apparatus through the first optical fiber, where the third group of optical signals comprises a fifth optical signal having a third wavelength and a sixth optical signal having a fourth wavelength; the first optical transceiver apparatus is configured to convert the fifth optical signal and the sixth optical signal into two second electrical signals correspondingly; the third optical transceiver apparatus is further configured to convert the two second electrical signals having been received into a fourth group of optical signals, before sending to the first optical transceiver apparatus through the second optical fiber, where the fourth group of optical signals comprises a seventh optical signal having the third wavelength and an eighth optical signal having the fourth wavelength; and the first optical transceiver apparatus is configured to convert the seventh optical signal and the eighth optical signal into two second electrical signals correspondingly;

the first wavelength, the second wavelength, the third wavelength, and the fourth wavelength are different from each other, while both the first optical fiber and the second optical fiber are able to transmit simultaneously the first optical signal, the second optical signal, the third optical signal, the fourth optical signal, the fifth optical signal, the sixth optical signal, the seventh optical signal, and the eighth optical signal.

In an embodiment, the first optical transceiver apparatus comprises a first transmitting chip, a first receiving chip, a first bidirectional multiplexer, and a second bidirectional multiplexer;

the first transmitting chip connects to the first bidirectional multiplexer and the second bidirectional multiplexer respectively, the first bidirectional multiplexer connects to the first optical fiber, and the second bidirectional multiplexer connects to the second optical fiber;

the first transmitting chip is configured to convert the four first electrical signals having been received into the first group of optical signals and the second group of optical signals, before transmitting the first group of optical signals to the first bidirectional multiplexer, and transmitting the second group of optical signals to the second bidirectional multiplexer;

the first bidirectional multiplexer is configured to multiplex the first optical signal and the second optical signal in the first group of optical signals to obtain a first multiplexed optical signal, and send the first multiplexed optical signal to the first optical fiber for transmission;

the second bidirectional multiplexer is configured to multiplex the third optical signal and the fourth optical signal in the second group of optical signals to obtain a second multiplexed optical signal, and send the second multiplexed optical signal to the second optical fiber for transmission.

In an embodiment, the first transmitting chip is a silicon optical device, comprising a first transmitting channel and a second transmitting channel;

the first transmission channel and the second transmission channel are independent of each other;

the first transmission channel is configured to convert two of the four first electrical signals into the first group of optical signals, before transmitting to the first bidirectional multiplexer;

the second transmission channel is configured to convert remaining two of the four first electrical signals into the second group of optical signals, before transmitting to the second bidirectional multiplexer.

In an embodiment, the first transmission channel comprises a first electro-optic modulator, and the second transmission channel comprises a second electro-optic modulator;

the first electro-optic modulator is configured to convert two of the four first electrical signals into the first group of optical signals;

the second electro-optic modulator is configured to convert remaining two of the four first electrical signals into the second group of optical signals.

In an embodiment, the second optical transceiver apparatus comprises a third bidirectional multiplexer and a third receiving chip;

the third bidirectional multiplexer connects to the first bidirectional multiplexer through the first optical fiber, and the third bidirectional multiplexer further connects to the third receiving chip;

the third bidirectional multiplexer is configured to receive the first multiplexed optical signal transmitted by the first optical fiber, and demultiplex the first multiplexed optical signal to obtain the first group of optical signals, then the third receiving chip converts the first optical signal and the second optical signal in the first group of optical signals into two first electrical signals correspondingly.

In an embodiment, the first optical transceiver apparatus further comprises a first receiving chip, the first receiving chip connects to the first bidirectional multiplexer and the second bidirectional multiplexer respectively;

the second optical transceiver apparatus further comprises a third transmitting chip; the third bidirectional multiplexer further connects to the third transmitting chip;

the third transmitting chip is configured to convert the two second electrical signals having been received into the third group of optical signals, the third bidirectional multiplexer is further configured to multiplex the fifth optical signal and the sixth optical signal in the third group of optical signals to obtain a third multiplexed optical signal, the third multiplexed optical signal is transmitted to the first bidirectional multiplexer through the first optical fiber, the first bidirectional multiplexer is further configured to demultiplex the third multiplexed optical signal to obtain the third group of optical signals, the first receiving chip converts the fifth optical signal and the sixth optical signal in the third group of optical signals into two second electrical signals correspondingly.

In an embodiment, the third optical transceiver apparatus comprises a fourth bidirectional multiplexer and a fourth receiving chip; the fourth bidirectional multiplexer is connected to the second bidirectional multiplexer by the second optical fiber, and the fourth bidirectional multiplexer is further connected to the fourth receiving chip;

the fourth bidirectional multiplexer is configured to receive the second multiplexed optical signal transmitted through the second optical fiber, and demultiplex the second multiplexed optical signal to obtain the second group of optical signals, then the fourth receiving chip converts the third optical signal and the fourth optical signal in the second group of optical signals into two first electrical signals correspondingly.

In an embodiment, the third optical transceiver apparatus further comprises a fourth transmitting chip; the fourth bidirectional multiplexer is further connected to the fourth transmitting chip;

the fourth transmitting chip is configured to convert the two second electrical signals having been received into the fourth group of optical signals, the fourth bidirectional multiplexer is further configured to multiplex the seventh optical signal and the eighth optical signal in the fourth group of optical signals to obtain a fourth multiplexed optical signal. The fourth multiplexed optical signal is transmitted to the second bidirectional multiplexer through the second optical fiber, the second bidirectional multiplexer demultiplexes the fourth multiplexed optical signal to obtain the fourth group of optical signals, the first receiving chip converts the seventh optical signal and the eighth optical signal in the fourth group of optical signals into two second electrical signals correspondingly.

In an embodiment, the first receiving chip is a silicon optical device, and the first receiving chip comprises a first receiving channel and a second receiving channel;

the first receiving channel and the second receiving channel are independent to each other; the first receiving channel is connected to the third bidirectional multiplexer, and the second receiving channel is connected to the fourth bidirectional multiplexer;

the first receiving channel is configured to receive the third group of optical signals from the third bidirectional multiplexer;

the second receiving channel is configured to receive the fourth group of optical signals from the fourth bidirectional multiplexer.

In an embodiment, the first receiving channel comprises a first photodetector; the second receiving channel comprises a second photodetector;

the first photodetector is configured to convert the fifth optical signal and the sixth optical signal in the third group of optical signals into two second electrical signals correspondingly;

the second photodetector is configured to convert the seventh optical signal and the eighth optical signal in the fourth group of optical signals into two second electrical signals correspondingly.

In an embodiment, the first bidirectional multiplexer comprises a first multiplexer and a first demultiplexer, and the second bidirectional multiplexer comprises a second multiplexer and a second demultiplexer;

the third bidirectional multiplexer comprises a third multiplexer and a third demultiplexer, and the fourth bidirectional multiplexer comprises a fourth multiplexer and a fourth demultiplexer;

the first multiplexer is configured to multiplex the first optical signal and the second optical signal in the first group of optical signals to obtain the first multiplexed optical signal;

the first demultiplexer is configured to demultiplex the third multiplexed optical signal to obtain the third group of optical signals;

the second multiplexer is configured to multiplex the third optical signal and the fourth optical signal in the second group of optical signals to obtain the second multiplexed optical signal;

the second demultiplexer is configured to demultiplex the fourth multiplexed optical signal to obtain the fourth group of optical signals;

the third multiplexer is configured to multiplex the fifth optical signal and the sixth optical signal in the third group of optical signals to obtain the third multiplexed optical signal;

the third demultiplexer is configured to demultiplex the first multiplexed optical signal to obtain the first group of optical signals;

the fourth multiplexer is configured to multiplex the seventh optical signal and the eighth optical signal in the fourth group of optical signals to obtain the fourth multiplexed optical signal;

the fourth demultiplexer is configured to demultiplex the second multiplexed optical signal to obtain the second group of optical signals.

In an embodiment, the first wavelength is 1271 nm, the second wavelength is 1311 nm, the third wavelength is 1291 nm, and the fourth wavelength is 1331 nm.

In an embodiment, the first electrical signal is a four-level pulse amplitude modulation signal, and the second electrical signal is a four-level pulse amplitude modulation signal.

In an embodiment, a structure of the second optical transceiver apparatus is as same as a structure of the third optical transceiver apparatus.

According to a second aspect of an embodiment of the present application, a communication node is provided, the communication node is the first communication node or the second communication node stated hereinabove.

According to a third aspect of an embodiment of the present application, an optical transceiver apparatus is provided, the optical transceiver apparatus is the first optical transceiver apparatus, the second optical transceiver apparatus, or the third optical transceiver apparatus stated hereinabove.

Beneficial Effects

Compared with the prior art, the present application has following beneficial effects: since the communication system comprises a first communication node, a second communication node, a first optical fiber, and a second optical fiber, wherein the first communication node comprises a first optical transceiver apparatus, and the second communication node comprises a second optical transceiver apparatus and a third optical transceiver apparatus; the first optical transceiver apparatus is in a bidirectional optical communication connection with the second optical transceiver apparatus through the first optical fiber, and the first optical transceiver apparatus is in a bidirectional optical communication connection with the third optical transceiver apparatus through the second optical fiber; the first optical transceiver apparatus, the second optical transceiver apparatus and the third optical transceiver apparatus are all silicon optical devices; the first optical transceiver apparatus is configured to convert four first electrical signals having been received into a first group of optical signals and a second group of optical signals, and send the first group of optical signals to the second optical transceiver apparatus through the first optical fiber, and send the second group of optical signals to the third optical transceiver apparatus through the second optical fiber; the first group of optical signals comprises a first optical signal having a first wavelength and a second optical signal having a second wavelength, the second group of optical signals comprises a third optical signal having the first wavelength and a fourth optical signal having the second wavelength; the second optical transceiver apparatus is configured to convert the first optical signal and the second optical signal in the first group of optical signals into two first electrical signals correspondingly, and the third optical transceiver apparatus is configured to convert the third optical signal and the fourth optical signal in the second group of optical signals into two first electrical signals correspondingly; the second optical transceiver apparatus is further configured to convert two second electrical signals having been received into a third group of optical signals, before sending to the first optical transceiver apparatus through the first optical fiber, where the third group of optical signals comprises a fifth optical signal having a third wavelength and a sixth optical signal having a fourth wavelength; the first optical transceiver apparatus is configured to convert the fifth optical signal and the sixth optical signal into two second electrical signals correspondingly; the third optical transceiver apparatus is further configured to convert the two second electrical signals having been received into a fourth group of optical signals, before sending to the first optical transceiver apparatus through the second optical fiber, where the fourth group of optical signals comprises a seventh optical signal having the third wavelength and an eighth optical signal having the fourth wavelength; and the first optical transceiver apparatus is configured to convert the seventh optical signal and the eighth optical signal into two second electrical signals correspondingly, the first wavelength, the second wavelength, the third wavelength, and the fourth wavelength are different from each other, while both the first optical fiber and the second optical fiber are able to transmit simultaneously the first optical signal, the second optical signal, the third optical signal, the fourth optical signal, the fifth optical signal, the sixth optical signal, the seventh optical signal, and the eighth optical signal. That is, the technical solution of the present application can adopt a silicon optical device on a basis of a wavelength-division multiplexing technology to achieve a bidirectional communication, further since a silicon material has a wide source and a low cost, a manufacturing process of the silicon optical device is compatible with a mature CMOS technology, a preparation cost can be effectively reduced, meanwhile, the silicon optical device supports a wafer-level testing, being able to reduce a cost to test a single chip greatly. Therefore, it is possible to lower a cost significantly, and improve an optical fiber capacity, being able to achieve a one-way four-signal simultaneous transmission, or a bidirectional eight-signal simultaneous transmission, thereby a bidirectional whole capacity of a communication system is improved, and a transmission rate is improved. In summary, the technical solution of the present application can reduce a cost of a communication system but increase a transmission rate thereof.

DETAILED DESCRIPTION

Figure 1:
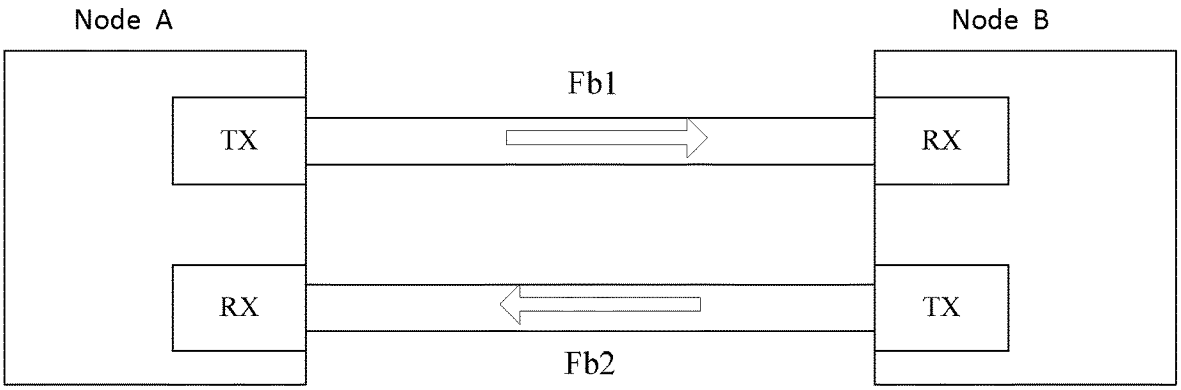
FIG. 1 illustrates a schematic structural diagram on a dual-fiber bidirectional transmission system based on space-division multiplexing according to the prior art.
Figure 2:
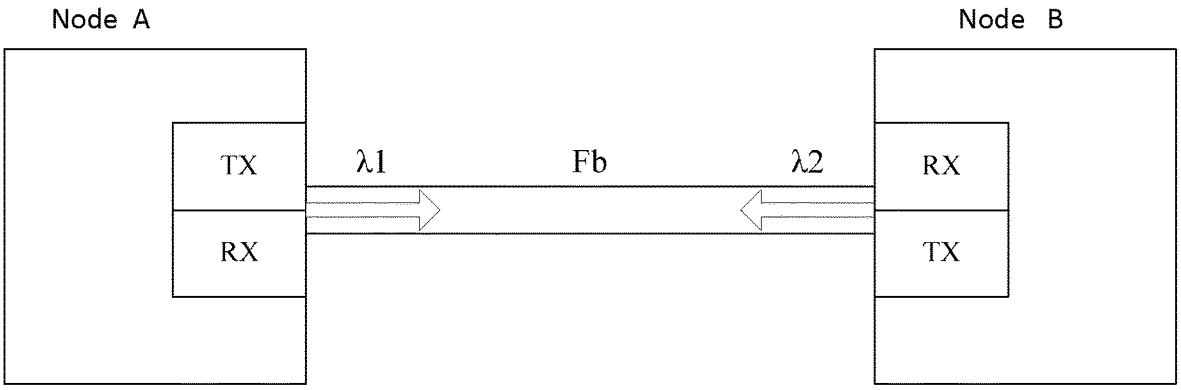
FIG. 2 illustrates a schematic structural diagram on a single-fiber bidirectional communication system based on wavelength-division multiplexing according to the prior art.

Unless otherwise defined, technical terms or scientific terms used in the present specification and claims shall have the ordinary meaning as understood by one of ordinary skill in the art to which the present application belongs. The detailed description of the present application will be described below with reference to the accompanying drawings. It should be noted that, in the specific description of these embodiments, in order to describe the brief description, all features of an actual implementation may not be described in detail in the present description. A person skilled in the art can modify and replace the embodiments of the present application without departing from the spirit and scope of the present application, and the obtained embodiments are also within the protection scope of the present application.

According to the prior art, a dual-fiber bidirectional transmission system based on space-division multiplexing has following defects:

1) a huge consumption for optical fiber resource is required: each bidirectional connection needs to occupy two independent optical fibers, which not only directly increases a cost for optical fiber lines, but also easily leads to rapid resource depletion when having a limited optical fiber resource;
2) infrastructure costs and complexity are high: an amount of the optical fibers being doubled means a plurality of companion infrastructure shall also be expanded correspondingly, which comprises more optical fiber distribution frames, a larger number of fusion points, and a heavier optical cable, thereby increasing deployment complexity and an overall cost;
3) insufficient flexibility for optical fiber capacity upgrading: when a capacity of an existing optical fiber is exhausted, an only method for capacity expansion is laying a new optical fiber. But if a pipeline resource is full or it is limited by a construction work, a high cost and engineering difficulty will appear, thus lacking a flexibility of achieving smooth expansion through technology upgrade on basis of an existing optical fiber.

A single-fiber bidirectional communication system based on wavelength-division multiplexing has following defects:

1) system complexity and cost are high: in order to achieve single-fiber bidirectional transmission, a plurality of key passive devices including a wavelength multiplexer, a beam splitter and an optical circulator and a more precise optical assembly shall be introduced, resulting in a cost increase of an optical module, and a complexity of system design and integration significantly increase;
2) a problem of reflection and crosstalk is significant: a plurality of reflection sources in a link including a connector, a fusion point and more, may reflect a part of local transmission signals to a local receiving end, bringing interference to a weak signal transmitted from a distal end. Therefore, it requires to adopt a multiplexer/demultiplexer or a circulator having a high-isolation to suppress crosstalk, which provides a strict requirement for device performance. A reflected noise may reduce receiver sensitivity, may also limit a transmission distance or require to boost a transmission power, while generating a higher requirement to cleanliness and fusion quality of a connector;
3) operation/maintenance and troubleshooting are difficult: all bidirectional services are concentrated in a single optical fiber, once the optical fiber is broken, the bidirectional communication will completely fail, and the fault will have a larger influence range. Testing the operation and maintenance is also more complicated, requiring an optical power meter having a filtering function or a special optical time domain reflectometer to distinguish a plurality of optical signals in different wavelength directions, while a conventional instrument is susceptible to be affected by a light in another direction. In addition, it requires to manage wavelength pairing strictly, and a module is unable to be replaced arbitrarily, otherwise communication interruption may happen;
4) a system power budget is tighter: an insertion loss introduced by the wavelength multiplexer or the beam splitter (usually 0.5 dB to several dB) may occupy a certain power left in a system, which may cause a maximum transmission distance of a single-fiber bidirectional system to be lower than that of a dual-fiber bidirectional system under a same condition.

In order to solve the technical problem of the dual-fiber bidirectional transmission system based on space-division multiplexing having a high cost, a complex system, a low optical fiber capacity, and the single-fiber bidirectional communication system based on wavelength-division multiplexing having a complex system, a high cost, and a tight system power budget, the present application provides an optical transceiver apparatus, a communication node, and a communication system.

Detailed descriptions on some embodiments of the present application are stated hereinafter with reference to the accompanying drawings. When there is no confliction, the following embodiments and features in the embodiments can be combined with each other.

Figure 3:
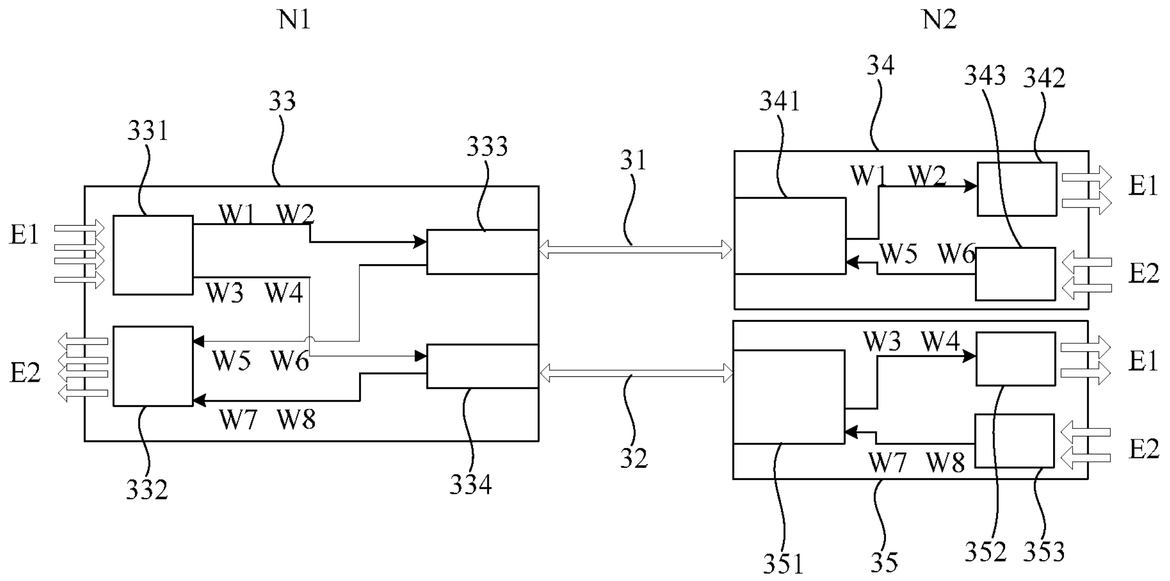
FIG. 3 illustrates a schematic structural diagram on a communication system according to an embodiment of the present application.

An embodiment of the present application provides a communication system, referencing to FIG. 3, the communication system comprises: a first communication node N1, a second communication node N2, a first optical fiber 31, and a second optical fiber 32.

Referencing to FIG. 3, the first communication node N1 comprises a first optical transceiver apparatus 33, and the second communication node N2 comprises a second optical transceiver apparatus 34 and a third optical transceiver apparatus 35. the first optical transceiver apparatus 33 is in a bidirectional optical communication connection with the second optical transceiver apparatus 34 through the first optical fiber 31, and the first optical transceiver apparatus 33 is in a bidirectional optical communication connection with the third optical transceiver apparatus 35 through the second optical fiber 32.

The first optical transceiver apparatus 33, the second optical transceiver apparatus 34 and the third optical transceiver apparatus 35 are all silicon optical devices.

The first optical transceiver apparatus 33 is configured to convert four first electrical signals E1 having been received into a first group of optical signals and a second group of optical signals, and send the first group of optical signals to the second optical transceiver apparatus 34 through the first optical fiber 31, and send the second group of optical signals to the third optical transceiver apparatus 35 through the second optical fiber; the first group of optical signals comprises a first optical signal W1 of a first wavelength and a second optical signal W2 of a second wavelength, the second group of optical signals comprises a third optical signal W3 of the first wavelength and a fourth optical signal W4 of the second wavelength; the second optical transceiver apparatus 34 is configured to convert the first optical signal W1 and the second optical signal W2 in the first group of optical signals into two first electrical signals E1 correspondingly, and the third optical transceiver apparatus 35 is configured to convert the third optical signal W3 and the fourth optical signal W4 in the second group of optical signals into two first electrical signals E1 correspondingly. Thus, it achieves to transmit four electric signals unidirectionally from the first communication node N1 to the second communication node N2.

The second optical transceiver apparatus 34 is further configured to convert two second electrical signals E2 having been received into a third group of optical signals, before sending to the first optical transceiver apparatus 33 through the first optical fiber 31, where the third group of optical signals comprises a fifth optical signal W5 of a third wavelength and a sixth optical signal W6 of a fourth wavelength; the first optical transceiver apparatus 33 is configured to convert the fifth optical signal W5 and the sixth optical signal W6 into two second electrical signals E2 correspondingly.

The third optical transceiver apparatus 35 is further configured to convert the two second electrical signals E2 having been received into a fourth group of optical signals, before sending to the first optical transceiver apparatus 33 through the second optical fiber 32, where the fourth group of optical signals comprises a seventh optical signal W7 of the third wavelength and an eighth optical signal W8 of the fourth wavelength; and the first optical transceiver apparatus 33 is configured to convert the seventh optical signal W7 and the eighth optical signal W8 into two second electrical signals E2 correspondingly. The first wavelength, the second wavelength, the third wavelength, and the fourth wavelength are different from each other, while both the first optical fiber 31 and the second optical fiber 32 are able to transmit simultaneously the first optical signal W1, the second optical signal W2, the third optical signal W3, the fourth optical signal W4, the fifth optical signal W5, the sixth optical signal W6, the seventh optical signal W7, and the eighth optical signal W8. Thus, it achieves to transmit four electric signals unidirectionally from the second communication node N2 to the first communication node N1. In such a way, it achieves to transmit simultaneously totally eight signals bidirectionally.

In an embodiment, the first wavelength may be 1271 nm, the second wavelength may be 1311 nm, the third wavelength may be 1291 nm, and the fourth wavelength may be 1331 nm, but not limited thereto.

Referring to FIG. 3, in an embodiment, the first optical transceiver apparatus 33 comprises a first transmitting chip 331, a first receiving chip 332, a first bidirectional multiplexer 333 and a second bidirectional multiplexer 334. The second optical transceiver apparatus 34 comprises a third bidirectional multiplexer 341, a third receiving chip 342 and a third transmitting chip 343. The third optical transceiver apparatus 35 comprises a fourth bidirectional multiplexer 351, a fourth receiving chip 352 and a fourth transmitting chip 353.

In an embodiment, a structure of the second optical transceiver apparatus 34 is identical to that of the third optical transceiver apparatus 35.

Referring to FIG. 3, the first transmitting chip 331 is connected to the first bidirectional multiplexer 333 and the second bidirectional multiplexer 334 respectively, and the first receiving chip 332 is connected to the first bidirectional multiplexer 333 and the second bidirectional multiplexer 334 respectively. The first bidirectional multiplexer 333 is further connected to the third bidirectional multiplexer 341 through the first optical fiber 31, and the third bidirectional multiplexer 341 is further connected to the third receiving chip 342 and the third transmitting chip 343 respectively. The second bidirectional multiplexer 334 is connected to the fourth bidirectional multiplexer 351 through the second optical fiber 32, and the fourth bidirectional multiplexer 351 is further connected to the fourth receiving chip 352 and the fourth transmitting chip 353 respectively.

The first transmitting chip 331, the first receiving chip 332, the first bidirectional multiplexer 333, the second bidirectional multiplexer 334, the third bidirectional multiplexer 341, the third receiving chip 342, the third transmitting chip 343, the fourth bidirectional multiplexer 351, the fourth receiving chip 352, and the fourth transmitting chip 353 are all silicon optical chips.

The first transmitting chip 331 is configured to convert the four first electrical signals E1 having been received into a first group of optical signals and a second group of optical signals, before transmitting the first group of optical signals to the first bidirectional multiplexer 333, and transmitting the second group of optical signals to the second bidirectional multiplexer 334.

In an embodiment, the first transmission chip 331 comprises a first transmitting channel and a second transmitting channel. The first transmission channel and the second transmission channel are independent of each other. The first transmission channel is configured to convert two of the four first electrical signals E1 into the first group of optical signals, before transmitting to the first bidirectional multiplexer 333. The second transmission channel is configured to convert remaining two of the four first electrical signals E1 into the second group of optical signals, before transmitting to the second bidirectional multiplexer 334.

In an embodiment, the first transmission channel comprises a first electro-optic modulator, and the second transmission channel comprises a second electro-optic modulator. The first electro-optic modulator is configured to convert two of the four first electrical signals E1 into the first group of optical signals, and the second electro-optic modulator is configured to convert remaining two of the four first electrical signals E1 into the second group of optical signals.

In an embodiment, both the first transmission channel and the second transmission channel may be, but not limited to, an FR2 transmission channel. The FR2 is an optical interface conforming to a standard specification, and generally refers to a physical scheme having a transmission distance of 2 km, and adopting an advanced modulation format such as PAM4, wherein an electrical interface, an optical wavelength, power consumption, and performance are all defined according to a standard. The first emitting chip 331 has two independent FR2 transmission channels integrated, being able to process and drive two independent optical signals synchronously.

The first bidirectional multiplexer 333 is configured to multiplex the first optical signal W1 and the second optical signal W2 in the first group of optical signals to obtain a first multiplexed optical signal, and send the first multiplexed optical signal to the first optical fiber 31 for transmission;

the second bidirectional multiplexer 334 is configured to multiplex the third optical signal W3 and the fourth optical signal W4 in the second group of optical signals to obtain a second multiplexed optical signal, and send the second multiplexed optical signal to the second optical fiber 32 for transmission.

The third bidirectional multiplexer 341 is configured to receive the first multiplexed optical signal transmitted by the first optical fiber 31, and demultiplex the first multiplexed optical signal to obtain the first group of optical signals, then the third receiving chip 342 converts the first optical signal W1 and the second optical signal W2 in the first group of optical signals into two first electrical signals E1 correspondingly.

The fourth bidirectional multiplexer 351 is configured to receive the second multiplexed optical signal transmitted through the second optical fiber 32, and demultiplex the second multiplexed optical signal to obtain the second group of optical signals, then the fourth receiving chip 352 converts the third optical signal W3 and the fourth optical signal W4 in the second group of optical signals into two first electrical signals E1 correspondingly. the third transmitting chip 343 is configured to convert the two second electrical signals E2 having been received into the third group of optical signals, the third bidirectional multiplexer 341 is further configured to multiplex the fifth optical signal W5 and the sixth optical signal W6 in the third group of optical signals to obtain a third multiplexed optical signal, the third multiplexed optical signal is transmitted to the first bidirectional multiplexer 333 through the first optical fiber 31, the first bidirectional multiplexer 333 is further configured to demultiplex the third multiplexed optical signal to obtain the third group of optical signals, the first receiving chip 332 converts the fifth optical signal W5 and the sixth optical signal W6 in the third group of optical signals into two second electrical signals E2 correspondingly.

The fourth transmitting chip 353 is configured to convert the two second electrical signals E2 having been received into the fourth group of optical signals, the fourth bidirectional multiplexer 351 is further configured to multiplex the seventh optical signal W7 and the eighth optical signal W8 in the fourth group of optical signals to obtain a fourth multiplexed optical signal. The fourth multiplexed optical signal is transmitted to the second bidirectional multiplexer 334 through the second optical fiber 32, the second bidirectional multiplexer 334 demultiplexes the fourth multiplexed optical signal to obtain the fourth group of optical signals, the first receiving chip 332 converts the seventh optical signal W7 and the eighth optical signal W8 in the fourth group of optical signals into two second electrical signals E2 correspondingly.

In an embodiment, the first receiving chip 332 comprises a first receiving channel and a second receiving channel. The first receiving channel and the second receiving channel are independent to each other. The first receiving channel is connected to the third bidirectional multiplexer 341, and the second receiving channel is connected to the fourth bidirectional multiplexer 351. The first receiving channel is configured to receive the third group of optical signals from the third bidirectional multiplexer 341. The second receiving channel is configured to receive the fourth group of optical signals from the fourth bidirectional multiplexer 351.

In an embodiment, the first receiving channel comprises a first photodetector; the second receiving channel comprises a second photodetector. The first photodetector is configured to convert the fifth optical signal W5 and the sixth optical signal W6 in the third group of optical signals into two second electrical signals E2 correspondingly. The second photodetector is configured to convert the seventh optical signal W7 and the eighth optical signal W8 in the fourth group of optical signals into two second electrical signals E2 correspondingly.

In an embodiment, both the first receiving channel and the second receiving channel are FR2 receiving channels, being able to receive and process two optical signals simultaneously.

In an embodiment, the first bidirectional multiplexer 333 comprises a first multiplexer and a first demultiplexer, and the second bidirectional multiplexer 334 comprises a second multiplexer and a second demultiplexer; the third bidirectional multiplexer 335 comprises a third multiplexer and a third demultiplexer, and the fourth bidirectional multiplexer 351 comprises a fourth multiplexer and a fourth demultiplexer.

The first multiplexer is configured to multiplex the first optical signal W1 and the second optical signal W2 in the first group of optical signals to obtain the first multiplexed optical signal. The first demultiplexer is configured to demultiplex the third multiplexed optical signal to obtain the third group of optical signals. The second multiplexer is configured to multiplex the third optical signal W3 and the fourth optical signal W4 in the second group of optical signals to obtain the second multiplexed optical signal. The second demultiplexer is configured to demultiplex the fourth multiplexed optical signal to obtain the fourth group of optical signals. The third multiplexer is configured to multiplex the fifth optical signal W5 and the sixth optical signal W6 in the third group of optical signals to obtain the third multiplexed optical signal. The third demultiplexer is configured to demultiplex the first multiplexed optical signal to obtain the first group of optical signals. The fourth multiplexer is configured to multiplex the seventh optical signal W7 and the eighth optical signal W8 in the fourth group of optical signals to obtain the fourth multiplexed optical signal. The fourth demultiplexer is configured to demultiplex the second multiplexed optical signal to obtain the second group of optical signals.

In an embodiment, the first electrical signal E1 is a four-level pulse amplitude modulation (PAM4) signal, and the second electrical signal is a four-level pulse amplitude modulation (PAM4) signal.

In an embodiment, the first electrical signal E1 is a 200 G four-level pulse amplitude modulation (PAM4) signal, the second electrical signal E2 is a four-level pulse amplitude modulation (PAM4) signal, and a total system transmission capacity can reach 1.6 Tbps.

In an embodiment of the present application, the communication system comprises the first communication node N1 and the second communication node N2, adopting a heterogeneous integration scheme to achieve a high-performance bidirectional transmission. The first communication node N1 has a first transmitting chip 331, a first receiving chip 332, a first bidirectional multiplexer 333, and a second bidirectional multiplexer 334 integrated, achieving a high-density integration, being able to simplify a system. While the second communication node N2 adopts a distributed integration scheme and consists of two independent silicon optical chips. the technical solution of the present application can adopt a silicon optical device on a basis of a wavelength-division multiplexing technology to achieve a bidirectional communication, further since a silicon material has a wide source and a low cost, a manufacturing process of the silicon optical device is compatible with a mature CMOS technology, a preparation cost can be effectively reduced, meanwhile, the silicon optical device supports a wafer-level testing, being able to reduce a cost to test a single chip greatly. Therefore, it is possible to lower a cost significantly, and improve an optical fiber capacity, being able to achieve a one-way four-signal simultaneous transmission, or a bidirectional eight-signal simultaneous transmission, thereby a bidirectional whole capacity of a communication system is improved, and a transmission rate is improved. In summary, the technical solution of the present application can reduce a cost of a communication system but increase a transmission rate thereof.

In the present application, the first optical transceiver apparatus 33 may be a silicon optical chip, having a plurality of core elements including a single-chip integrated modulator, a photoelectric detector, a multiplexer, a demultiplexer and more integrated thereon, thus having a high integration degree and a compact size, which facilitates a lower signal transmission delay.

In the present application, a single-wavelength channel (a transmission channel of each optical signal) supports a 200 G transmission rate, and by four wavelength multiplexing, it is able to achieve a unidirectional transmission of 4×200G, and a bidirectional transmission having a total capacity reaching 1.6 Tbps. In addition, the silicon optical chip itself has a feature of low power consumption, which helps to further reduce an overall power consumption of a communication system.

Another embodiment of the present application provides a communication node. The communication node is the first communication node N1 in any one of the embodiments stated hereinabove.

Another embodiment of the present application provides a communication node. The communication node is the second communication node N2 in any one of the embodiments stated hereinabove.

Another embodiment of the present application provides an optical transceiver apparatus. The optical transceiver apparatus is the first optical transceiver apparatus 33 of any one of the embodiments stated hereinabove.

Another embodiment of the present application provides an optical transceiver apparatus. The optical transceiver apparatus is the second optical transceiver apparatus 34 of any one of the embodiments stated hereinabove.

Another embodiment of the present application provides an optical transceiver apparatus. The optical transceiver apparatus is the third optical transceiver apparatus 35 of any one of the embodiments stated hereinabove.

In the present application, the terms "first" and "second" are used for descriptive purposes only and are not to be construed as indicating or implying relative importance. The term "a plurality of" means two or more, unless expressly defined otherwise.

The description of the embodiments stated above is intended to facilitate a person of ordinary skill in the art to understand and apply the present application. Those skilled in the art can easily make various modifications to these embodiments, and apply the general principles described herein to other embodiments without involving any inventive effort. It should be understood that, the application of the present application is not limited to the above examples listed. It will be possible for a person skilled in the art to make modification or replacements according to the above descriptions, which shall all fall within the scope of protection in the appended claims of the present application.

What is claimed is:

1. A communication system, comprising: a first communication node, a second communication node, a first optical fiber, and a second optical fiber; wherein:

the first communication node comprises a first optical transceiver apparatus, and the second communication node comprises a second optical transceiver apparatus and a third optical transceiver apparatus; the first optical transceiver apparatus is in a bidirectional optical communication connection with the second optical transceiver apparatus through the first optical fiber, and the first optical transceiver apparatus is in a bidirectional optical communication connection with the third optical transceiver apparatus through the second optical fiber; the first optical transceiver apparatus, the second optical transceiver apparatus and the third optical transceiver apparatus are all silicon optical devices;

the first optical transceiver apparatus is configured to convert four first electrical signals having been received into a first group of optical signals and a second group of optical signals, send the first group of optical signals to the second optical transceiver apparatus through the first optical fiber, and send the second group of optical signals to the third optical transceiver apparatus through the second optical fiber; the first group of optical signals comprises a first optical signal having a first wavelength and a second optical signal having a second wavelength, the second group of optical signals comprises a third optical signal having the first wavelength and a fourth optical signal having the second wavelength; the second optical transceiver apparatus is configured to convert the first optical signal and the second optical signal in the first group of optical signals into two first electrical signals correspondingly, and the third optical transceiver apparatus is configured to convert the third optical signal and the fourth optical signal in the second group of optical signals into two first electrical signals correspondingly;

the second optical transceiver apparatus is further configured to convert two second electrical signals having been received into a third group of optical signals, before sending to the first optical transceiver apparatus through the first optical fiber, where the third group of optical signals comprises a fifth optical signal having a third wavelength and a sixth optical signal having a fourth wavelength; the first optical transceiver apparatus is configured to convert the fifth optical signal and the sixth optical signal into two second electrical signals correspondingly; the third optical transceiver apparatus is further configured to convert the two second electrical signals having been received into a fourth group of optical signals, before sending to the first optical transceiver apparatus through the second optical fiber, where the fourth group of optical signals comprises a seventh optical signal having the third wavelength and an eighth optical signal having the fourth wavelength; and the first optical transceiver apparatus is configured to convert the seventh optical signal and the eighth optical signal into two second electrical signals correspondingly; and the first wavelength, the second wavelength, the third wavelength, and the fourth wavelength are different from each other, while both the first optical fiber and the second optical fiber are able to transmit simultaneously the first optical signal, the second optical signal, the third optical signal, the fourth optical signal, the fifth optical signal, the sixth optical signal, the seventh optical signal, and the eighth optical signal.

2. The communication system according to claim 1, wherein the first optical transceiver apparatus comprises a first transmitting chip, a first receiving chip, a first bidirectional multiplexer, and a second bidirectional multiplexer; wherein the first transmitting chip connects to the first bidirectional multiplexer and the second bidirectional multiplexer respectively, the first bidirectional multiplexer connects to the first optical fiber, and the second bidirectional multiplexer connects to the second optical fiber;

the first transmitting chip is configured to convert the four first electrical signals having been received into the first group of optical signals and the second group of optical signals, before transmitting the first group of optical signals to the first bidirectional multiplexer, and transmitting the second group of optical signals to the second bidirectional multiplexer;

the first bidirectional multiplexer is configured to multiplex the first optical signal and the second optical signal in the first group of optical signals to obtain a first multiplexed optical signal, and send the first multiplexed optical signal to the first optical fiber for transmission; and the second bidirectional multiplexer is configured to multiplex the third optical signal and the fourth optical signal in the second group of optical signals to obtain a second multiplexed optical signal, and send the second multiplexed optical signal to the second optical fiber for transmission.

3. The communication system according to claim 2, wherein the first transmitting chip is a silicon optical device, and comprises a first transmitting channel and a second transmitting channel;

the first transmission channel and the second transmission channel are independent of each other;

the first transmission channel is configured to convert two of the four first electrical signals into the first group of optical signals, before transmitting to the first bidirectional multiplexer;

the second transmission channel is configured to convert remaining two of the four first electrical signals into the second group of optical signals, before transmitting to the second bidirectional multiplexer.

4. The communication system according to claim 3, wherein the first transmission channel comprises a first electro-optic modulator, and the second transmission channel comprises a second electro-optic modulator; wherein the first electro-optic modulator is configured to convert two of the four first electrical signals into the first group of optical signals; and the second electro-optic modulator is configured to convert remaining two of the four first electrical signals into the second group of optical signals.

5. The communication system according to claim 2, wherein the second optical transceiver apparatus comprises a third bidirectional multiplexer and a third receiving chip; wherein the third bidirectional multiplexer connects to the first bidirectional multiplexer through the first optical fiber, and the third bidirectional multiplexer further connects to the third receiving chip; and the third bidirectional multiplexer is configured to receive the first multiplexed optical signal transmitted by the first optical fiber, and demultiplex the first multiplexed optical signal to obtain the first group of optical signals, then the third receiving chip converts the first optical signal and the second optical signal in the first group of optical signals into two first electrical signals correspondingly.

6. The communication system according to claim 5, wherein the first optical transceiver apparatus further comprises a first receiving chip connecting to the first bidirectional multiplexer and the second bidirectional multiplexer respectively; wherein:

the second optical transceiver apparatus further comprises a third transmitting chip; the third bidirectional multiplexer further connects to the third transmitting chip; and the third transmitting chip is configured to convert the two second electrical signals having been received into the third group of optical signals, the third bidirectional multiplexer is further configured to multiplex the fifth optical signal and the sixth optical signal in the third group of optical signals to obtain a third multiplexed optical signal, the third multiplexed optical signal is transmitted to the first bidirectional multiplexer through the first optical fiber, the first bidirectional multiplexer is further configured to demultiplex the third multiplexed optical signal to obtain the third group of optical signals, the first receiving chip converts the fifth optical signal and the sixth optical signal in the third group of optical signals into two second electrical signals correspondingly.

7. The communication system according to claim 6, wherein the third optical transceiver apparatus comprises a fourth bidirectional multiplexer and a fourth receiving chip; the fourth bidirectional multiplexer is connected to the second bidirectional multiplexer by the second optical fiber, and the fourth bidirectional multiplexer is further connected to the fourth receiving chip; wherein the fourth bidirectional multiplexer is configured to receive the second multiplexed optical signal transmitted through the second optical fiber, and demultiplex the second multiplexed optical signal to obtain the second group of optical signals, then the fourth receiving chip converts the third optical signal and the fourth optical signal in the second group of optical signals into two first electrical signals correspondingly.

8. The communication system according to claim 7, wherein the third optical transceiver apparatus further comprises a fourth transmitting chip connecting to the fourth bidirectional multiplexer; wherein the fourth transmitting chip is configured to convert the two second electrical signals having been received into the fourth group of optical signals, the fourth bidirectional multiplexer is further configured to multiplex the seventh optical signal and the eighth optical signal in the fourth group of optical signals to obtain a fourth multiplexed optical signal; the fourth multiplexed optical signal is transmitted to the second bidirectional multiplexer through the second optical fiber, the second bidirectional multiplexer demultiplexes the fourth multiplexed optical signal to obtain the fourth group of optical signals, the first receiving chip converts the seventh optical signal and the eighth optical signal in the fourth group of optical signals into two second electrical signals correspondingly.

9. The communication system according to claim 8, wherein the first receiving chip is a silicon optical device, and the first receiving chip comprises a first receiving channel and a second receiving channel;

the first receiving channel and the second receiving channel are independent to each other; the first receiving channel is connected to the third bidirectional multiplexer, and the second receiving channel is connected to the fourth bidirectional multiplexer;

the first receiving channel is configured to receive the third group of optical signals from the third bidirectional multiplexer;

the second receiving channel is configured to receive the fourth group of optical signals from the fourth bidirectional multiplexer.

10. The communication system according to claim 9, wherein the first receiving channel comprises a first photodetector; the second receiving channel comprises a second photodetector;

wherein the first photodetector is configured to convert the fifth optical signal and the sixth optical signal in the third group of optical signals into two second electrical signals correspondingly; and the second photodetector is configured to convert the seventh optical signal and the eighth optical signal in the fourth group of optical signals into two second electrical signals correspondingly.

11. The communication system according to claim 8, wherein the first bidirectional multiplexer comprises a first multiplexer and a first demultiplexer, and the second bidirectional multiplexer comprises a second multiplexer and a second demultiplexer;

the third bidirectional multiplexer comprises a third multiplexer and a third demultiplexer, and the fourth bidirectional multiplexer comprises a fourth multiplexer and a fourth demultiplexer; wherein the first multiplexer is configured to multiplex the first optical signal and the second optical signal in the first group of optical signals to obtain the first multiplexed optical signal;

the first demultiplexer is configured to demultiplex the third multiplexed optical signal to obtain the third group of optical signals;

the second multiplexer is configured to multiplex the third optical signal and the fourth optical signal in the second group of optical signals to obtain the second multiplexed optical signal;

the second demultiplexer is configured to demultiplex the fourth multiplexed optical signal to obtain the fourth group of optical signals;

the third multiplexer is configured to multiplex the fifth optical signal and the sixth optical signal in the third group of optical signals to obtain the third multiplexed optical signal;

the third demultiplexer is configured to demultiplex the first multiplexed optical signal to obtain the first group of optical signals;

the fourth multiplexer is configured to multiplex the seventh optical signal and the eighth optical signal in the fourth group of optical signals to obtain the fourth multiplexed optical signal; and the fourth demultiplexer is configured to demultiplex the second multiplexed optical signal to obtain the second group of optical signals.

12. The communication system according to claim 1, wherein the first wavelength is 1271 nm, the second wavelength is 1311 nm, the third wavelength is 1291 nm, and the fourth wavelength is 1331 nm.

13. The communication system according to claim 1, wherein the first electrical signal is a four-level pulse amplitude modulation signal, and the second electrical signal is a four-level pulse amplitude modulation signal.

14. The communication system according to claim 1, wherein a structure of the second optical transceiver apparatus is the same as a structure of the third optical transceiver apparatus.

15. A communication node, wherein the communication node is the first communication node or the second communication node according to claim 1.

16. An optical transceiver apparatus, wherein the optical transceiver apparatus is the first optical transceiver apparatus, the second optical transceiver apparatus, or the third optical transceiver apparatus according to claim 1.

* * * * *